July 22, 1941.   J. E. DUBE   2,250,362
EXPANSION VALVE
Filed Sept. 30, 1939.
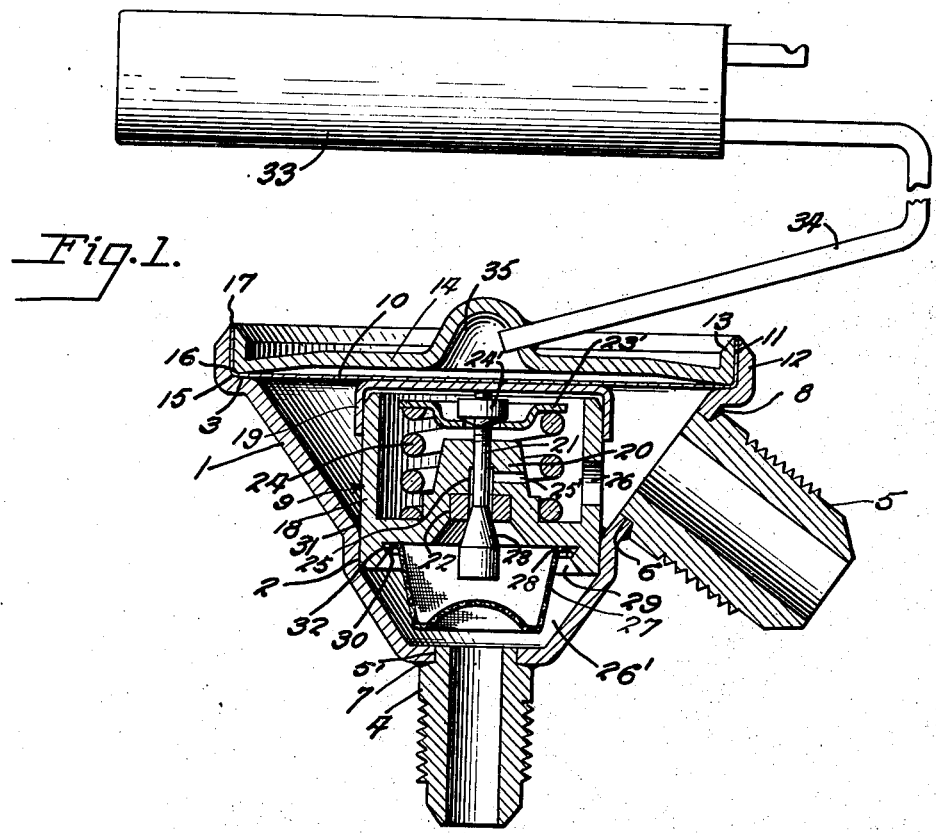
Inventor
J. E. Dube
By Mason Fenwick & Lawrence
Attorneys Patented July 22, 1941

2,250,362

UNITED STATES PATENT OFFICE 2,250,362

EXPANSION VALVE

John E. Dube, St. Louis, Mo., assignor to Alco Valve Company, St. Louis, Mo., a corporation of Missouri Application September 30, 1939, Serial No. 297,397

2 Claims. (Cl. 137—153)

This invention relates to expansion valves of the type generally employed in refrigeration systems for the automatic admission of liquid refrigerant to the evaporator.

One of the objects of the invention is to provide an expansion valve in a new and inexpensive form suitable for mass production.

Another object of the invention is the provision in an expansion valve, of a housing having a seat for a diaphragm and a seat for a valve cage assembly with a diaphragm and a valve cage assembly on the respective seats, and integrally united to said housing, the valve cage assembly comprising relatively telescopic enclosing members, one of which contacts the diaphragm and moves responsive thereto for operating the valve element of the expansion valve.

Still another object of the invention relates to an expansion valve having a housing stamped or otherwise formed from sheet material having a diaphragm seat with a surrounding flange extending substantially perpendicular to the normal plane of the diaphragm and forming with said seat a peripheral corner inherently rounded due to the stamping, in cooperation with a stamped cover plate having a surrounding flange substantially perpendicular to the plane of the diaphragm and with a peripheral corner inherently rounded due to the stamping, the diaphragm being clamped upon said seat and having a flanged edge clamped between the flanges of said housing and cover plate, the cooperating rounding corners of said housing and cover plate preventing the abrupt angular deflection of the flanged portion of said diaphragm from the main portion thereof and avoiding a sharp line of possible fracture at the bend, which would otherwise be set up in said diaphragm.

Still another object of the invention relates to a reverse form of expansion valve in which the liquid refrigerant enters on top of, instead of below the valve pin, the advantage of this form of construction being to permit the use of smaller valve ports.

Other objects of the invention will appear as the following description of preferred and practical embodiments thereof proceeds.

In the drawing which accompanies and forms a part of the following specification, and throughout the several figures of which the same characters of reference have been employed to denote identical parts:

Figure 1 is an axial section through an expansion valve embodying the principles of the present invention, shown in association with a thermostatic capsule;

Figure 2 is a similar view of a modified form of the invention; and

Figure 3 is a cross-section taken along the line 3—3 of Figure 2.

Referring now in detail to the several figures, the numeral 1 represents the housing which in the present exemplary embodiment of the invention is stamped from sheet metal. Said housing is formed with a cylindrical seat 2 at an intermediate point and a substantially flat annular seat 3 adjacent its upper or wider end. The housing is provided with an inlet nipple 4 and an outlet nipple 5, the bore of the inlet nipple being smaller than that of the outlet nipple, for the obvious reason that the former is a passage for liquid refrigerant, while the latter is a passage for mixed liquid and gaseous refrigerant.

The nipples 4 and 5 may be made in any ordinary manner, as by turning upon a lathe, and inserted in suitable apertures 5' and 6 punched out of the housing 1, and are preferably welded, as indicated at 7 and 8, to said housing in a fluid-tight manner.

A valve cage assembly 9, which is externally cylindrical, fits at its lower end in the seat 2 and projecting upwardly into the chamber formed by the flaring walls of the upper and larger portion of the housing, in spaced relation to said walls, and a diaphragm 10 bridges the upper end of the housing, resting upon the seat 3. The peripheral margin of the diaphragm is upturned, forming a flange 11 which is clampably positioned between an upstanding peripheral flange 12 on the housing and a peripheral flange 13 constituted by the upturned margin of the cover plate 14.

The fact that the housing is stamped from sheet metal causes the peripheral corner angle 15 between the seat 3 and flange 12 to be inherently rounded. The cover plate 14 is preferably stamped from sheet metal and the peripheral corner 16 is for this reason also inherently rounded. The diaphragm 10 is pressed between these two peripheral corners so that juncture of the flange 11 with the bridging portion of the diaphragm is not a sharp angular edge, but a blunt or rounded edge. This prevents a line of weakness being formed at the angle, and avoids incipient fracture which may result in the destruction of the diaphragm through its continual vibration. The flanges 11, 12 and 13 preferably terminate in a common line 17 and the external juncture of these flanges along said line is permanently sealed by welding, preferably by an atomic hydrogen weld.

In that form of the invention shown in Figure 1 the valve cage assembly 9 is composed of two closure members, the hollow body 18 and the upper flanged cap plate 19, the latter being of substantially the same diameter as and freely telescoping upon the body member. The body member may be turned, cast or made in any other desired manner and provides a spring chamber in which is disposed an internal boss 20 having a central bore for guiding the valve pin 21. Said boss preferably has a wear-resisting valve seat 22 mounted axially therein and engaged by the head 23 of the valve pin. Said valve pin is normally biased in its closed position by a spring 24 enclosed within the cage chamber, surrounding the boss 20 and pressing upwardly against a spring cup 23' which surrounds the valve pin and is retained by a nut 24' screwed onto the upper end of the valve pin. The boss 20 has an enlarged counter-bore 25 above the valve seat 22 which communicates by way of a port 25' in said boss and a port 26 in the cage body, with the outlet nipple 5. The inlet nipple 4 communicates with the chamber 26' in the lower end of said housing and through a strainer 27 with the lower portion of the valve pin. When the valve pin is in open position a through passage is established through the valve cage from the inlet of the lower housing chamber to the upper housing chamber and to the outlet of the expansion valve.

The strainer 27, which depends into the chamber formed by the lower portion of the housing, has an outwardly extending peripheral flange 28 which seats upwardly in a countersink 29 in the lower end of the cage body. An expansion ring 30 fits against the flanged edge of said strainer and expands into an undercut recess 32 in the lower face of the cage body, retaining the strainer in place.

After the valve cage assembly has been pressed into its seat 24, it is secured to the housing in any suitable manner, as by soldering, the line of union being indicated by the reference character 31. The main purpose of the soldering is to make a hermetic seal between the inlet and outlet sides of the valve to prevent refrigerant by-passing the valve.

When this soldering has been accomplished, the strainer 27 becomes irremovable from the expansion valve.

A thermostatic capsule 33 communicates by way of the tube 34 with the upper diaphragm chamber 35 formed between the cover plate 14 and the diaphragm 10. When the fluid in the thermostatic capsule volatilizes, increasing the pressure in the diaphragm chamber 35, the diaphragm presses down against the cover plate 19 which is normally maintained against said diaphragm by the pressure of the valve spring 24. The cover plate is forced down by the diaphragm compressing the spring 24 and opening the valve pin 21. When the fluid in the thermostatic capsule contracts or condenses, an opposite condition prevails in the expansion valve, and the thermostat moves up, releasing pressure upon the valve pin, permitting it to close under the urge of the spring 24.

The cover plate 19 is broad and flat, presenting an extensive area of contact to the diaphragm 10, thus distributing pressure widely through said diaphragm and lengthening its life. The cover plate is not only guided by the cage assembly 9, but the top edge of said cage assembly constitutes a stop for the cover plate, thus limiting the downward travel of the diaphragm and consequently limiting the valve opening.

In that form of the invention shown in Figures 2 and 3, the construction and relative arrangement of the housing 1, diaphragm 10, and cover plate 14 is the same as in that form of the invention shown in Figure 1. The valve cage assembly, however, is modified to the extent that it now consists of a body portion 36 having a chamber or recess 37 in its lower end closed by a screw plug 38, the point between the body portion and screw plug being eventually soldered to avoid short circuiting of liquid refrigerant around the valve aperture. Within the recess is a plunger shell 39 carrying the valve pin 40 at its upper end, said valve pin coacting with a valve seat 41 which is preferably of wear-resisting material. The cage assembly body member 36 is formed with serially communicating bores or passages 42, 43 and 44 which form a conduit communicating with the liquid inlet nipple 4. The recess 37 has a lateral passage 45 leading to the outlet nipple 5. A cover plate 19 telescopes upon the top of the body member 36 and normally rests against the diaphragm 10. Said cover plate has downwardly extending plungers 46 which pass through suitable apertures in the cage body member and bear against the plunger shell 39. Said plunger shell is normally biased by a spring 47 in a direction to hold the valve pin 40 in closed position relative to the valve seat 41. The plungers 46 press upon the plunger shell 39. When the diaphragm is depressed through increase in pressure in the diaphragm chamber 48 the diaphragm presses the plungers 46 downwardly, depressing the plunger shell 39 and causing the valve to open. When the pressure in the chamber 48 diminishes, the diaphragm withdraws the plungers 46, releasing the compression upon the spring 47, and permitting the plunger shell and the valve pin 40 to resume their normal closed position.

In the form of the invention just described, the valve port may be made smaller than in the previous described modification of the invention, because the port opening is not obstructed by a push rod.

It is obvious that through the formation of certain parts of this expansion valve by stamping them from sheet metal, not only is a cheap form of construction made possible suitable for mass production, but positive mechanical advantages grow out of the use of stamping.

It will be apparent to those skilled in the art that numerous changes in the form and arrangement of the parts as hereinbefore described may be resorted to as the exigencies of use may determine to be desirable, without departing from the spirit and scope of the invention as defined in the appended claims.

What I claim as my invention is:

1. An expansion valve comprising a housing having a lower pressure chamber of relatively small diameter and an upper chamber of relatively larger diameter and of progressively increasing diameter in an upward direction, the lower pressure chamber being provided with an inlet opening at its bottom and the upper pressure chamber being provided with a lateral outlet opening between its bottom and top, a valve cage fitted and secured at its lower end in the housing at a point between said pressure chambers and extending upwardly into the upper chamber in spaced relation to its walls, said cage closing direct communication between the chambers and having a spring containing chamber therein, a fluid conducting passage including an inlet portion leading from the bottom of the cage to the spring containing chamber and an outlet portion leading from the spring containing chamber through a side of the cage and communicating with the upper pressure chamber for flow of fluid from the lower pressure chamber to the upper pressure chamber through the valve cage, a valve controlling the flow of fluid through the inlet portion of said passage into the spring containing chamber, a spring in the spring containing chamber for holding the valve normally closed, a cover closing the top of the upper pressure chamber, and a diaphragm disposed between the valve cage and cover and movable downwardly under a predetermined pressure to open the valve.

2. An expansion valve comprising a housing having a lower portion of relatively small diameter and of inverted frusto-conical form, an upper portion of relatively larger diameter and of inverted frusto-conical form, and a valve cage seat formed at the juncture of said portions, said housing portions forming high and low pressure chambers, the former having an inlet opening at its bottom and the latter having an outlet opening in one of its side walls between its bottom and top, a valve cage fitted and secured at its lower end in said seat and closing direct communication between said pressure chambers, said cage extending upwardly from the seat into the upper chamber in spaced relation to its walls and having a spring containing chamber therein, a fluid conducting passage including an inlet portion leading from the bottom of the cage to the spring containing chamber and an outlet portion leading from the spring containing chamber through a side of the cage and communicating with the upper pressure chamber for flow of fluid from the lower pressure chamber to the upper pressure chamber through the valve cage, a valve controlling the flow of fluid through the inlet portion of said passage into the spring containing chamber, a spring in the spring containing chamber for holding the valve normally closed, a cover closing the top of the upper pressure chamber, and a diaphragm disposed between the valve cage and cover and movable downwardly under a predetermined pressure to open the valve.

JOHN E. DUBE.